(12) United States Patent
Alex et al.

(10) Patent No.: US 8,499,336 B2
(45) Date of Patent: Jul. 30, 2013

(54) SESSION REDUNDANCY AMONG A SERVER CLUSTER

(75) Inventors: Arun C. Alex, Nashua, NH (US); Stinson Mathai, Wheaton, IL (US)

(73) Assignee: Cisco Technology, Inc., San Jose, CA (US)

(*) Notice: Subject to any disclaimer, the term of this patent is extended or adjusted under 35 U.S.C. 154(b) by 180 days.

(21) Appl. No.: 12/952,441

(22) Filed: Nov. 23, 2010

(65) Prior Publication Data
US 2012/0131639 A1     May 24, 2012

(51) Int. Cl.
G06F 21/00          (2006.01)

(52) U.S. Cl.
USPC ............................................................ 726/3

(58) Field of Classification Search
USPC .............. 726/6–8, 11, 12; 713/153, 168, 170; 709/248, 247
See application file for complete search history.

(56) References Cited

U.S. PATENT DOCUMENTS

| | | | |
|---|---|---|---|
| 5,361,249 A | 11/1994 | Monastra et al. |
| 5,436,886 A | 7/1995 | McGill et al. |
| 5,583,867 A | 12/1996 | Poole |
| 5,631,908 A | 5/1997 | Saxe |
| 5,787,070 A | 7/1998 | Gupta et al. |
| 5,982,746 A | 11/1999 | Hanson et al. |
| 6,052,751 A | 4/2000 | Runaldue et al. |
| 6,195,705 B1 | 2/2001 | Leung |
| 6,351,466 B1 | 2/2002 | Prabhakar et al. |
| 6,361,249 B1 | 3/2002 | Hodgkinson et al. |
| 6,487,605 B1 | 11/2002 | Leung |
| 6,621,810 B1 | 9/2003 | Leung |
| 6,700,868 B2 | 3/2004 | Smith et al. |
| 6,724,756 B2 | 4/2004 | Fourie et al. |
| 6,751,191 B1 | 6/2004 | Kanekar et al. |
| 6,771,623 B2 | 8/2004 | Ton et al. |
| 6,788,204 B1 | 9/2004 | Ianelli et al. |
| 6,795,705 B1 | 9/2004 | Warrier et al. |
| 6,799,204 B1 | 9/2004 | Baba et al. |
| 6,801,975 B1 | 10/2004 | Young |
| 7,006,431 B1 | 2/2006 | Kanekar et al. |
| 7,032,135 B2 | 4/2006 | Harel et al. |
| 7,065,094 B2 | 6/2006 | Petersen et al. |
| 7,080,151 B1 | 7/2006 | Borella et al. |

(Continued)

FOREIGN PATENT DOCUMENTS

| | | |
|---|---|---|
| EP | 1 783 979 | 5/2007 |
| JP | 2001-236257 A | 8/2001 |

(Continued)

OTHER PUBLICATIONS

International Search Report and Written Opinion issued for PCT/US11/61907, dated Apr. 6, 2012, 8 pages.

(Continued)

Primary Examiner — Ario Etienne
Assistant Examiner — Kidest Mendaye
(74) Attorney, Agent, or Firm — Wilmer Cutler Pickering Hale and Dorr LLP (57) ABSTRACT

Systems and methods are provided for providing redundancy and failover for servers communicating via an authentication protocol. Mirroring is initiated at the beginning of a Diameter application session by an enhanced Diameter server, which continuously provides updates of the Diameter session to one or more peer Diameter mirror servers and thereby maintains an active mirror of the session.

20 Claims, 6 Drawing Sheets

U.S. PATENT DOCUMENTS

| | | | |
|---|---|---|---|
| 7,130,276 | B2 | 10/2006 | Chen et al. |
| 7,161,930 | B1 | 1/2007 | Wang et al. |
| 7,173,917 | B1 | 2/2007 | Narayanan et al. |
| 7,227,863 | B1 | 6/2007 | Leung et al. |
| 7,248,560 | B1 | 7/2007 | Blankenship et al. |
| 7,269,133 | B2 | 9/2007 | Lu et al. |
| 7,324,500 | B1 | 1/2008 | Blackmon et al. |
| 7,340,169 | B2 | 3/2008 | Ovadia et al. |
| 7,457,882 | B2 | 11/2008 | Stewart et al. |
| 7,554,903 | B2 | 6/2009 | Blankenship et al. |
| 7,599,285 | B2 | 10/2009 | Zhou et al. |
| 7,657,260 | B2 | 2/2010 | Meng |
| 7,715,310 | B1 | 5/2010 | Sajassi et al. |
| 7,827,307 | B2 | 11/2010 | Lehrschall et al. |
| 7,835,378 | B2 | 11/2010 | Wijnands et al. |
| 7,889,637 | B2 | 2/2011 | Bradbury et al. |
| 7,903,647 | B2 | 3/2011 | Kanekar et al. |
| 7,945,655 | B2 * | 5/2011 | Lisiecki et al. ............... 709/223 |
| 7,953,826 | B2 | 5/2011 | Howarth |
| 8,004,968 | B2 | 8/2011 | Sajassi et al. |
| 8,223,687 | B2 | 7/2012 | Cheever et al. |
| 2001/0021175 | A1 | 9/2001 | Haverinen |
| 2002/0010865 | A1 | 1/2002 | Fulton et al. |
| 2002/0067704 | A1 | 6/2002 | Ton |
| 2002/0080752 | A1 | 6/2002 | Johansson et al. |
| 2002/0097672 | A1 | 7/2002 | Barbas et al. |
| 2002/0163924 | A1 | 11/2002 | Kim |
| 2002/0165944 | A1 | 11/2002 | Wisner et al. |
| 2003/0073439 | A1 | 4/2003 | Wenzel et al. |
| 2003/0182433 | A1 | 9/2003 | Kulkarni et al. |
| 2003/0200330 | A1 | 10/2003 | Oelke et al. |
| 2003/0215232 | A1 | 11/2003 | Jahn et al. |
| 2004/0066749 | A1 | 4/2004 | Watanabe |
| 2004/0090941 | A1 | 5/2004 | Faccin et al. |
| 2004/0095881 | A1 | 5/2004 | Borella et al. |
| 2004/0114510 | A1 | 6/2004 | Miller et al. |
| 2004/0202126 | A1 | 10/2004 | Leung et al. |
| 2004/0233922 | A1 | 11/2004 | Van Wageningen et al. |
| 2005/0207382 | A1 | 9/2005 | Hirashima et al. |
| 2005/0207429 | A1 | 9/2005 | Akita et al. |
| 2005/0226148 | A1 | 10/2005 | Assarpour |
| 2006/0174039 | A1 | 8/2006 | Stewart et al. |
| 2006/0282662 | A1 * | 12/2006 | Whitcomb ................... 713/156 |
| 2007/0066273 | A1 | 3/2007 | Laroia et al. |
| 2007/0066329 | A1 | 3/2007 | Laroia et al. |
| 2007/0116019 | A1 | 5/2007 | Cheever et al. |
| 2007/0165516 | A1 | 7/2007 | Xu et al. |
| 2007/0206563 | A1 | 9/2007 | Silver et al. |
| 2007/0240209 | A1 | 10/2007 | Lewis et al. |
| 2007/0245167 | A1 | 10/2007 | De La Cruz et al. |
| 2007/0253328 | A1 | 11/2007 | Harper et al. |
| 2008/0227451 | A1 * | 9/2008 | Fukui et al. ................ 455/435.1 |
| 2008/0247308 | A1 | 10/2008 | Bhupalam et al. |
| 2009/0262741 | A1 | 10/2009 | Jungck et al. |
| 2010/0220656 | A1 | 9/2010 | Ramankutty et al. |

FOREIGN PATENT DOCUMENTS

| | | |
|---|---|---|
| WO | WO-99/52299 A2 | 10/1999 |
| WO | WO-00/45560 | 8/2000 |
| WO | WO-00/76260 A1 | 12/2000 |
| WO | WO-01/65783 | 9/2001 |
| WO | WO-03/25332 A1 | 3/2003 |
| WO | WO-03/085540 | 10/2003 |
| WO | WO-2003107698 A1 | 12/2003 |

OTHER PUBLICATIONS

Eng, et al., "An ATM Cross—Connect System for Broadband Trials and Applications," Global Telecommunications Conference, pp. 1454-1460, 1993 (8 pages).

Rathgeb, "Redundancy Concepts for a Large ATM Switching Node," International Switching Symposium, vol. 1, pp. 425-433, 1997 (10 pages).

International Search Report from PCT/US03/25332, Dec. 16, 2003 (5 pages).

International Search Report and Written Opinion issued for corresponding International Patent Application No. PCT/US2007/008302, Jul. 17, 2008 (9 pages).

International Search Report and Written Opinion issued for International Patent Application No. PCT/US2006/045256, Sep. 25, 2007 (6 pages).

International Search Report and Written Opinion issued for International Patent Application No. PCT/US2006/045326, Sep. 24, 2007 (6 pages).

"Service Gateway—RedBack SmartEdge 800", Falcon Communications Inc., www.falconcommunications.com/partners/redback3.htm, 2005 (9 pages).

\* cited by examiner

SESSION REDUNDANCY AMONG A SERVER CLUSTER

TECHNICAL FIELD

This disclosure relates to systems and methods for providing redundancy and failover for servers communicating via an authentication protocol.

BACKGROUND

In networks, such as wireless networks, it is desirable to allocate network resources according to policies or rules. These policies cover resources, such as network bandwidth, Quality of Service (QoS), and security (firewalls). With some types of content, such as web surfing, latency and packet loss might not significantly affect the quality of the content delivered, and the effect might not be noticeable. However, as the types of content delivered to mobile subscribers (e.g., cell phones, personal digital assistants (PDAs), and other handheld devices) become more diversified to include Voice over IP (VoIP), streaming media, and multiplayer gaming, these types of content require reliable network connections with fixed parameters. With content like this, delays and out-of-order arrival can be more significant.

A network with policy-based management uses rules to govern various aspects of the network behavior. Networks implementing policy-based management typically use a protocol for handling authentication, authorization and accounting (AAA) services. Two such protocols are Remote Authentication Dial-In User Service (RADIUS) and Diameter. Authentication refers to the process where an entity's identity is authenticated and matched to a user record, such as the mobile subscriber record for a user of a cellular telephone. Once the subscriber record has been identified, an AAA server may permit application services to determine whether the user is permitted to access certain services (authorization) and to record the activities of the user (accounting). One use of accounting is to be able to provide data in a form that is suitable for billing. These protocols may be implemented by one or more servers whose purpose is to provide AAA services. Diameter is a next-generation protocol intended to replace RADIUS as the AAA method of choice in next-generation cellular networks.

DESCRIPTION OF EXAMPLE EMBODIMENTS

Overview

Systems and methods for providing session redundancy in a cluster of authentication servers are disclosed. In one embodiment, a system comprises a memory, a processor operable to execute instructions stored in the memory, a network interface in communication with an authentication client on the service provider's network using an authentication protocol, an authentication module for maintaining state for an authentication session with the authentication client, and a mirroring module in communication with the authentication module. The mirroring module is configured to receive authentication messages from the authentication module and from the authentication client, to send the authentication messages to an authentication mirror server via the service provider's network, and to select the authentication mirror server from a pool of peer servers on the service provider's network, wherein the instructions are operable to send identifying information of the authentication mirror server to the authentication client via authentication protocol messages.

Example Embodiments

Systems and methods are provided for providing redundancy and failover for servers communicating via an authentication protocol. Policy servers using an authentication protocol should have a secure and reliable channel for communicating mission-critical information relating to billing, authorizing services requested by the client device, and authenticating a mobile device as an authorized user with an associated billing record. The Diameter protocol provides these functions, but does not provide mirroring, failover, and redundancy capabilities that can provide enhanced reliability. Methods for providing these reliability enhancements are given below in accordance with various embodiments.

Diameter is an authentication, authorization and accounting (AAA) protocol used in telecommunications networks and wireless networks. These networks have various needs, such as authenticating cell phone users when they appear on the network and charging them for services using accounting rules, as well as providing reliable and available AAA service throughout the network. Diameter was designed to meet these needs and to serve as a replacement for the Remote Authentication Dial-In User Service (RADIUS) protocol, which lacks a number of desirable features, such as IP mobility and policy control, and also has issues with reliability, scalability, security, and flexibility. Many of these features are missing because RADIUS was not originally envisioned to be used to provide services beyond basic authentication. RADIUS has been extended by various vendors, but the extensions are often proprietary and are not well specified.

With this in mind, Diameter is designed to exceed the performance of RADIUS in several respects. It designates transport control protocol (TCP) and stream control transmission protocol (SCTP) as transport, replacing the user datagram protocol (UDP), and is specifically written to be extensible via the use of Diameter applications, which extend the Diameter base protocol. Diameter also defines a policy protocol, allowing a single server to handle policies for many networks and services.

Diameter interactions take place when a client requiring authentication or another Diameter-provided service identifies the appropriate server and initiates a Diameter request with the server. The server then establishes a Diameter session. Mirroring is automatically initiated at the beginning of the Diameter application session by an enhanced Diameter server that continuously provides updates of the Diameter session to one or more peer Diameter mirror servers and thereby maintains an active mirror of the session. The Diameter client is informed of an address or domain name of the Diameter mirror. Upon failure of the Diameter server, various methods are provided for activating the Diameter mirror. The methods provided can be implemented with minimal configuration changes on the client, with the required intelligence being provided in the network. The methods can also provide rapid failover, good scalability, and little or no static configuration in peer servers.

Diameter allows for automatic discovery of peers through the use of domain name system (DNS) SRV or NAPTR records. These are types of DNS records associated with a hostname that can be served over the DNS protocol, and are commonly used in systems that support session initiation protocol (SIP).

Either DNS SRV records or NAPTR records can be used to store and share Diameter peer server information. A Diameter server can thus automatically discover peer servers on the network, which it may later use as mirrors. In some embodiments, a DNS server may be extended to specifically designate certain Diameter servers as mirror servers.

Diameter clients can communicate with Diameter servers over various protocols that include universal datagram protocol (UDP), transport control protocol (TCP), and stream control transmission protocol (SCTP). The Diameter protocol permits each software application using it to extend the base protocol by designating an application identifier and a set of associated attribute-value pairs (AVPs). Each such protocol extension is called a Diameter application. Examples of Diameter applications are the Diameter MobileIP application, the Diameter Extensible Authentication Protocol application, and the Diameter Session Initiation Protocol Application. Some AVPs are also part of the base protocol.

A Diameter session is a logical connection between two Diameter nodes, typically the interactions between a Diameter client and a Diameter server, but which may cross multiple connections as well. When a client contacts a Diameter server, it supplies a client-generated session ID. This session ID can be defined to be globally and eternally unique. The session ID is then used by the client and server in the course of further communication.

A Diameter session begins by the Diameter client issuing an Auth-Request message containing a unique session ID to a Diameter server, or to a Diameter proxy if message forwarding is required. The Auth-Request message utilizes Diameter application-specific AVP's, such that each application may use its own authentication protocol extensions. The Diameter server may include an Authorization-Lifetime AVP in its response. In this case, the Diameter client is re-authorized after the Authorization Lifetime has elapsed. If the Diameter client fails to reauthorize, the Diameter server may deallocate or tear down the session. Certain servers may use an Auth-Grace-Period AVP that inform the Diameter client that they will wait for an additional specified period before deallocating the session. Certain servers may use a Session-Lifetime AVP in conjunction with, or in place of, an Authorization-Lifetime AVP, with substantially identical semantics.

The failure of a Diameter client, or in some instances a Diameter server, may be detected using the Origin-State-ID AVP. This AVP is included by the sender of a request. This base protocol AVP increases monotonically, such that when the AVP does not increase, or when it increases unexpectedly, the recipient is alerted to a failure condition. When a Diameter server receives an Origin-State-ID that is greater than the Origin-State-ID previously received from that network node, it may assume that the message sender has lost state since the previous message, and that all sessions that were previously active have been terminated.

Failure of a Diameter client may also be detected by the expiration of timers specified in the Authorization-Lifetime, Auth-Grace-Period, and Session-Lifetime AVPs by the Diameter server. Failure to respond to the Diameter server within a certain specified time will result in the Diameter server sending a STR (session termination) message and cleaning up all resources assigned to the session at the Diameter server.

The failure of a Diameter server can be detected in the ordinary fashion by inferring failure from the failure of the Diameter server to respond to requests. This detection is facilitated by the use of a Session-Timeout AVP.

Session termination requests are used for orderly termination of Diameter sessions. When a session termination request is sent, the receiving Diameter server cleans up all resources being used by the session. These requests are provided for all sessions that require the Diameter server to preserve state. As the Diameter server propagates the STR request to every involved network device, the STR request also serves to inform servers that may be accessed only via proxy that their remote clients have failed.

If no messages have been exchanged for some time, either side may send a Device-Watchdog-Request message, and the other side responds with a Device-Watchdog-Answer. This mechanism is available for both sides to determine whether the other side has failed.

As specified, the Diameter protocol does not incorporate support for mirroring or automatic failover. If there are only two Diameter servers, if a first Diameter server fails and stops responding to Diameter requests, its clients may in some instances contact a second Diameter server to see if it is mirroring the first Diameter server.

With multiple Diameter servers, as would typically be the case for a large network or service provider's network, each server could potentially handle a large number of clients, with each client having many individual sessions that are each authenticated by a Diameter application. Each mirror server may be required to respond to and satisfy mirroring requests from all of the other Diameter servers. Further, in the case that a Diameter server fails, there is no clear way for a Diameter client to determine which of the many servers may be mirroring its session data.

Table 1 below identifies some interfaces that are Diameter-based on an Internet Multimedia System (IMS) network. Each network node identified in the "From" column may contain a Diameter client implementation that communicates with a Diameter server implementation on the network node identified in the "To" column. The interfaces have been named and further specified via many 3GPP standards.

TABLE 1

Diameter-based interfaces on an IMS network

| From | To | Interface Name |
| --- | --- | --- |
| S-CSCF | HSS (subscriber database) | Cx |
| S-CSCF | CCF (Charging function) | Rf, Ro |
| Application Function | HSS | Sh |
| Application Function | PCRF [Policy Control Function] | Rx |
| PCRF | GW [PGW/HSGW] | Gx, Gxa |
| Application Function | CCF | Rf |
| PGW | 3GPP AAA | S6b |
| MME | HSS | S6a |

Figure 1:
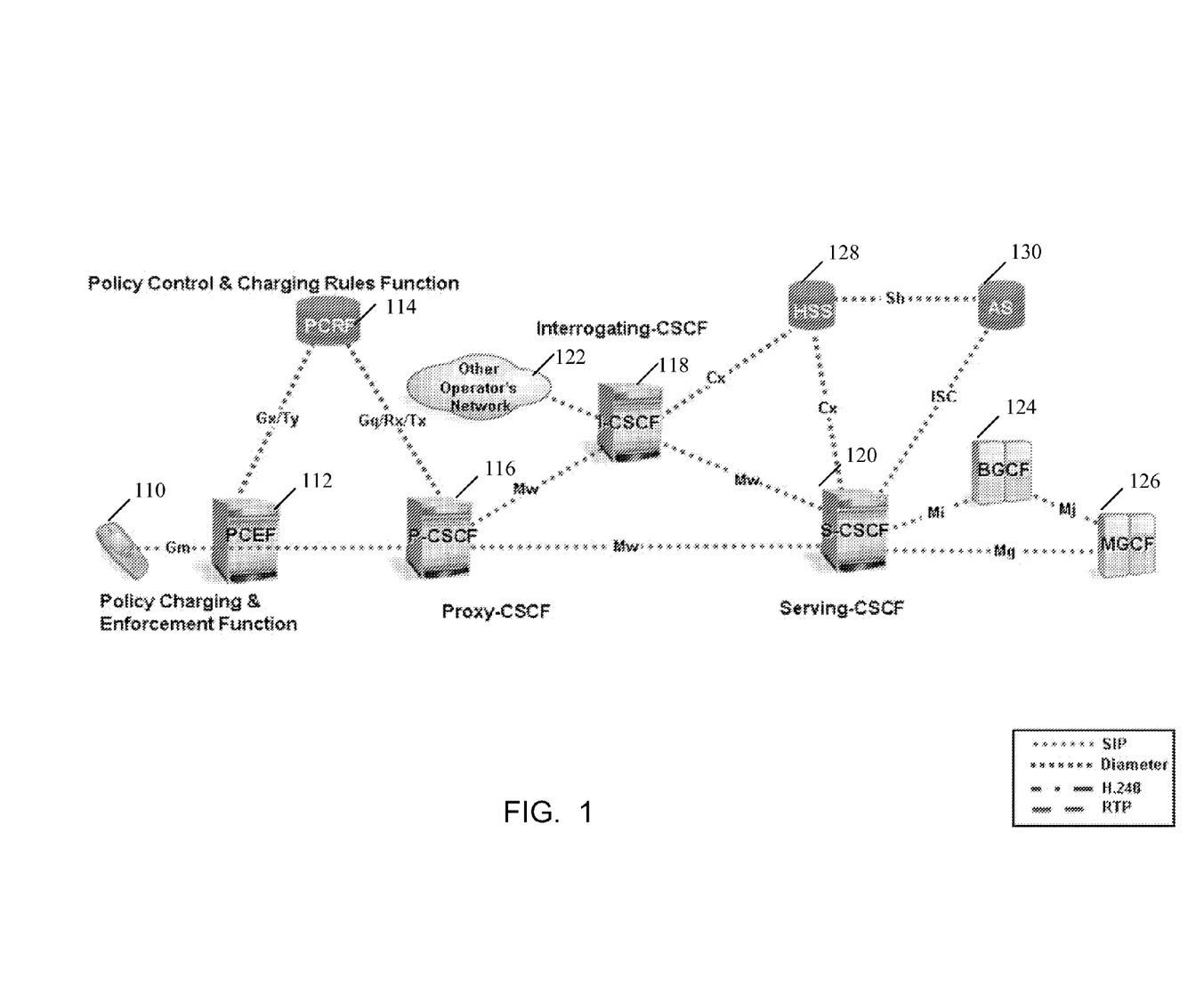
FIG. 1 is a schematic representation of a typical wireless data network using Diameter interfaces, in accordance with certain embodiments.

FIG. 1 illustrates a wireless IMS data network using the Diameter protocol in accordance with certain embodiments. FIG. 1 includes a user equipment (UE) 110 connected to a wireless network via a base station (not shown) and a radio access network (not shown), connected to a policy charging and enforcement function (PCEF) 112, a policy control and charging rules function (PCRF) 114, a Proxy-Call Session Control Function (P-CSCF) 116, an Interrogating-Call Session Control Function (I-CSCF) 111, a Serving-Call Session Control Function (S-CSCF) 120, another operator's network 122, a breakout gateway control function (BGCF) 124, a media gateway control function (MGCF) 126, a home subscriber server (HSS) 121, and an application server (AS) 130. PCEF 112 can be implemented on a network device and on a function such as a Gateway GPRS Serving Node (GGSN), a packet data gateway (PDG), a packet data interworking function (PDIF), a packet data serving node/home agent (PDSN/HA), or an access service network (ASN) gateway. In some embodiments, P-CSCF 116 and the policy proxy can be implemented on the same network device. In other embodiments, P-CSCF 116, PCEF 112, and the policy proxy can be implemented on the same network device. Each of the square dashed lines indicates a Diameter interface, e.g. the Gx/Ty, Gq/Rx/Tx, Cx, and Sh interfaces. In the figure, PCRF 114 and HSS 128 are Diameter servers, while PCEF 112, P-CSCF 116, I-CSCF 118, S-CSCF 120, and AS 130 are Diameter clients.

PCEF 112 is located at the gateway, which can be a GGSN, a packet data gateway (PDG), a packet data gateway interworking function (PDIF), a PDSN/HA, and/or an access service network gateway (ASN GW). The PCEF 112 provides service data flow detection and counting as well as online and offline charging interactions. The PCEF 112 can also provide policy enforcement toward the internet protocol-connectivity access network (IP-CAN). PCRF 114 combines flow based charging control and a policy decision function. The PCRF 114 can provision policy and charging control (PCC) rules to the PCEF 112 and inform the application function (AF) on the network device of traffic plane events. The Proxy-CSCF 116 can serve as the first contact point for the user equipment (UE) 110 and forward SIP messages in the network. P-CSCF 116 generates charging call-detail records, maintains a security association with UE 110, and authorizes bearer resource quality of service (QoS) through the application function (AF) toward the PCRF 114. P-CSCF 116 can also provide local service (e.g., 411 service and emergency service), lawful interception, and SIP header compression.

Interrogation-CSCF 118 can serve as the first contact between different operator's networks. The I-CSCF 118 also forwards SIP messages through the network, assigns S-CSCFs to sessions, generates charging call-detail records (CDRs), and provides topology hiding for the network. The Serving-CSCF 120 acts as a SIP registrar and provides IMS user authentication. The S-CSCF 120 loads IMS user profiles from the home subscriber server (HSS), provides person to person (P2P) and person to application (P2A) session control, and SIP application server service control. The S-CSCF 120 provides address translation support, generation of charging CDRs and lawful interception. P-CSCF 116, I-CSCF 118, and S-CSCF 120 are all typically Diameter clients.

Figure 2:
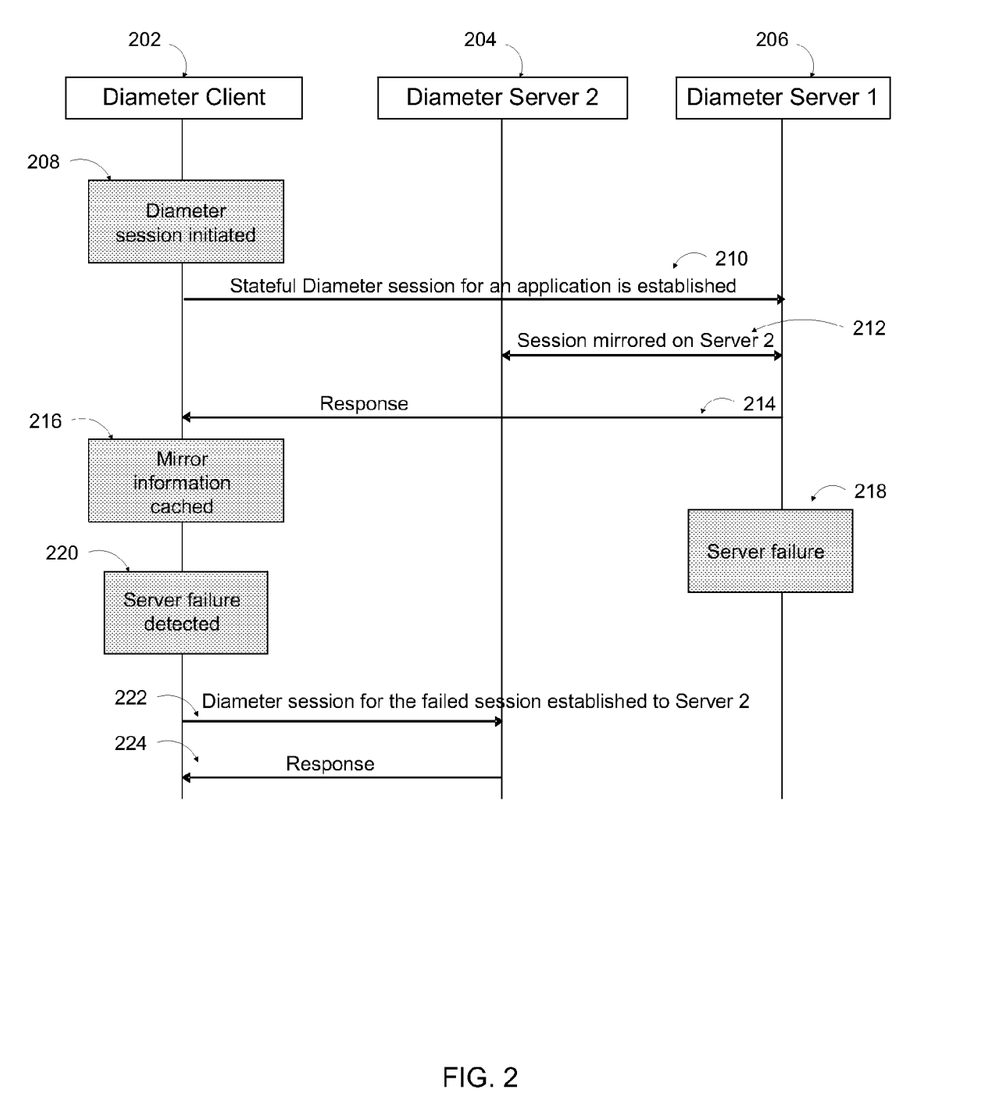
FIG. 2 is a signaling diagram of a wireless data network with a Diameter server performing mirroring to another Diameter server, in accordance with certain embodiments.

FIG. 2 is a call flow diagram in accordance with some embodiments. Diameter client 202 is in communication with first Diameter server 206, which mirrors the session with Diameter client 202 in conjunction with Diameter mirror server 204. At step 208, the Diameter client 202 initiates the Diameter session by contacting first Diameter server 206 with an Auth-Request message, providing a unique session ID that will be used throughout the session. First Diameter server 206 establishes a stateful Diameter session in step 210. In step 212, first Diameter server 206 sends a mirroring request to Diameter mirror server 204. An appropriate handshake occurs, so that first Diameter server 206 is made aware that Diameter mirror server 204 is in fact performing mirroring. From this point on, all Diameter messages and state updates sent or received by first Diameter server 206 will be forwarded to Diameter mirror server 204. These Diameter messages may be forwarded using the Diameter protocol in conjunction with vendor-specific extensions, or they may be forwarded using other protocols or communications methods. It is intended that each incoming Diameter message be forwarded immediately upon arrival to provide synchronization with the Diameter server. Diameter mirror server 204 may or may not respond to further mirroring messages from first Diameter server 206.

At step 214, Diameter server 206 responds to a initial Diameter request, which may be any Diameter request message, by Diameter client 202. Diameter server 206 may include an Authorization-Lifetime AVP or a Session-Lifetime AVP in its response. Diameter server 206 also informs Diameter client 202 that the present session is being mirrored, by sending a Session-Mirrored AVP to the client containing the hostname of Diameter mirror server 204. In some embodiments, multiple mirror servers may be selected, in which case, all of the selected mirror servers will be specified in the Session-Mirrored AVP. Multiple mirror servers may be provided by the DNS server in some embodiments. No specific response is required from Diameter client 202 at this time. However, Diameter client 202 may only take advantage of this information during failover if it stores the information received about its designated mirror servers, possibly in cache, as indicated at step 216. In some embodiments, mirroring information may be sent more than once, during periodic keep-alive messages or piggybacked on other traffic between Diameter client 202 and Diameter server 206. Diameter mirror server 204 would not typically directly contact Diameter client 202 at this stage.

At step 218, Diameter server 206 fails, and Diameter mirror server 204 is called upon to replace it in the active session with Diameter client 202. Diameter mirror server 204 could notice or detect the failure of Diameter server 206: or could be informed of the failure. A step 220, the failure is detected at Diameter client 202 in the normal course of communications. Diameter client 202 then accesses information about its designated Diameter mirror server stored in step 216, and at step 222 initiates a failover procedure by contacting Diameter mirror server 204. This may be done using a special failover message, or it may also be accomplished with minimal modification to the client software by simply resending the last request from Diameter client 202 to Diameter server 206 with the same session ID. Diameter mirror server 204 will be up to date as a result of the mirroring, and will be able to respond appropriately by continuing the session in step 224.

In some embodiments, Diameter protocol communications may take place across service providers, such as between a packet serving gateway (PGW) on one service provider and a policy charging and rules function (PCRF) on another. Such inter-service provider cases may involve Diameter proxy nodes between the PCRF and the PGW, spanning the Diameter-based Gx interface between them. This is commonly done for security and for topology hiding. In one embodiment, mirroring may be provided either by a Diameter mirror server within the same service provider's network or by a Diameter mirror server in the remote service provider's network. Use of a remote service provider's Diameter mirror server is possible using the standard Diameter proxy capability to proxy the connection across the existing inter-service provider Diameter connection.

In some embodiments, a large number of clients and Diameter servers may be present. In this case, some clients may be mirrored to one subset of Diameter servers, and other clients may be mirrored to another subset of Diameter servers. This is possible as the clients are informed as to which mirror server they should contact when their primary Diameter server fails. A related capability in some embodiments is the provisioning of multiple Diameter mirrors for a single client. These multiple mirrors may be relayed to the Diameter client in the same manner as described above, using additional AVP's or by otherwise extending a Diameter Application protocol.

It should be noted that the above description describes a mirroring schema that is granular to the session level. This allows for different mirrors to be selected on a per-session basis, as well as on a per-client basis, in some embodiments. In the case where multiple mirror servers exist, it is possible for a set of client sessions to be initially provisioned with an initial set of mirror servers, and the same clients subsequently provisioned with a different set of mirror servers based on availability at time of session allocation.

Although this system does not require a central administrative facility to exist in order for mirroring and failover to occur, a centralized mirroring table or coordinating facility to allocate and provision mirror servers may be used in some embodiments, such that mirrors may be selected at time of client provisioning or session provisioning based on various criteria including mirror server load and scheduled maintenance.

Figure 3:
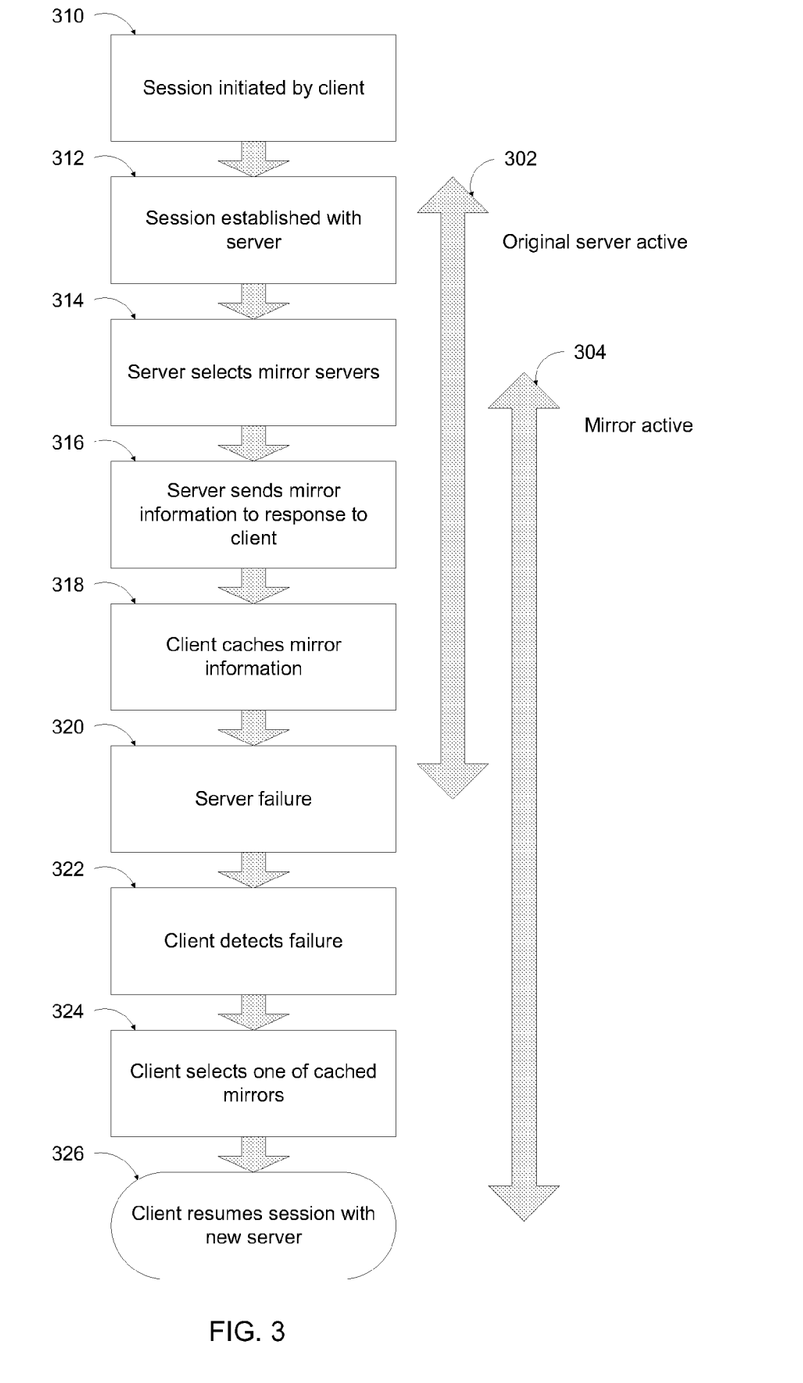
FIG. 3 is a flowchart of a Diameter server and client designed to perform mirroring, in accordance with certain embodiments.

FIG. 3 depicts an example of a Diameter mirroring scenario in flowchart form in accordance with some embodiments. Arrow 302 represents the section of the flowchart during which the original Diameter server is active. Arrow 304 represents the section of the flowchart during which the Diameter mirror server is active. At step 310, the Diameter application session is initiated by a Diameter client. The application session may be any kind of application which is stateful, including but not limited to policy, authentication, authorization, and accounting applications. The Diameter client may be any device capable of communicating via the Diameter protocol, such as a packet serving gateway (PGW), policy control rules function (PCRF), or home subscriber server/authorization, authentication and accounting (HSS/AAA) server. The client generates a unique and eternal session ID, which is sent to the Diameter server at this step.

At step 312, as the result of the application initialization a Diameter session is established between the client and one of the Diameter servers in the cluster based on the predefined configuration in the peer. The previously-generated session ID is retained at the server. At step 314, the Diameter server that accepts the connection creates a context for the session at a Diameter protocol module implemented in a combination of software and/or hardware. This Diameter protocol module directs another Diameter mirror module to select one or more of the other Diameter peer servers in the cluster as mirrors for the session. Selection may take place based on a variety of criteria including but not limited to mirror load, network topology, and security or network policies. This selection may take place within a Diameter mirror selection subroutine or module. Once the mirrors are designated for the session, the Diameter server retains this information in a Diameter mirror data store, associated with at least the session ID and possibly with a client ID. At step 316, the Diameter server then includes the mirror information in the response to the peer.

Subsequent to step 314, the Diameter mirror server becomes active, as is reflected by arrow 304. While both the original Diameter server and the Diameter mirror server are active, all Diameter session activity associated with the client-generated session ID is copied over the network to the Diameter mirror server, and the two servers are presumed to be in sync. The forwarding and mirroring activity may be performed by a Diameter mirroring module at the Diameter server. The Diameter mirror server is required to receive the mirrored Diameter messages from the Diameter server and store the messages in a data store associated with the session ID. The Diameter mirror server also does not respond to any Diameter requests which may appear in the mirrored Diameter protocol traffic from the Diameter server; instead, it remains passive. Handshaking between the Diameter server and the Diameter mirror server may be implemented using a Diameter protocol application, or by another means. If the Diameter server chooses to select another mirror because the mirror becomes unavailable or because other mirror servers become available, or for another reason, the Diameter server may update the list of mirrors any time to the client, which stores or updates the mirror information as necessary.

At step 318, the client receives and caches the mirror information until the session ends. The client may also update the mirror information in the cache when it is updated by the Diameter server. This may be done by the software module implementing Diameter on the client, or a specific Diameter mirror database or data store on the client. At step 320, the Diameter server fails due to one or more reasons, including but not limited to link failure, software failure, resource limitations, or hardware failure. At step 322, the client detects the failure by using one or more methods, including but not limited to link failure detection, protocol error detection, error feedback from the server or error feedback from one or more intermediaries. The failure may be detected by a specific failure detect software module or routine that exists within the Diameter module or Diameter protocol implementation on the client.

At step 324, upon detection of the failure the client invokes the Diameter mirror selection module, which accesses the Diameter mirror data store and selects one of the prior-stored Diameter mirror servers. The Diameter mirror selection module may use a variety of heuristics or algorithms, including but not limited to priority-based selection, path weight-based selection, load-based selection and random selection. At step 326, once the Diameter mirror server is selected the Diameter mirror selection module informs the Diameter protocol module on the client to continue the session with the new Diameter server. The continuation may be done proactively or as required. This may be done by the Diameter protocol module simply resending the previous message with the same session ID.

Figure 4:
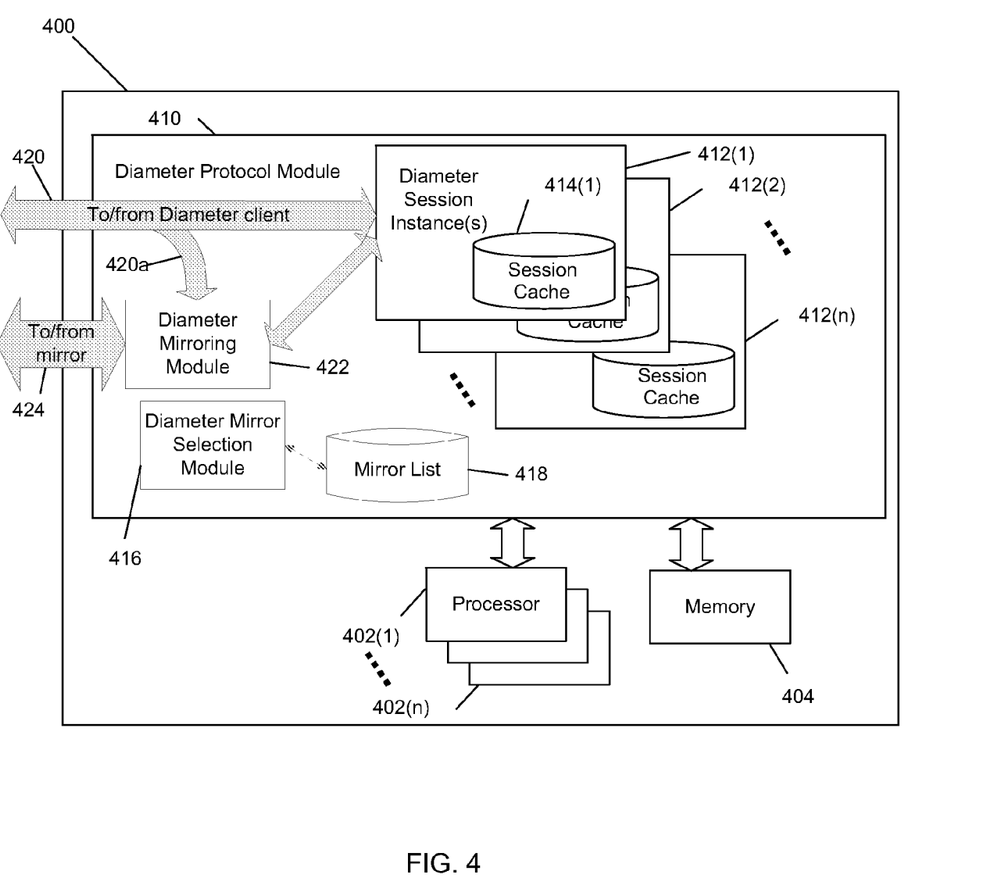
FIG. 4 is a functional block diagram of a Diameter server designed to perform mirroring, in accordance with certain embodiments.

FIG. 4 is a functional block diagram of a Diameter server implementing mirroring in accordance with some embodiments. Diameter server 400 represents a physical network node implementing a Diameter server in hardware or software, or in any combination thereof. The server may be a mobile multimedia entity (MME), PCRF, HSS/AAA, or other network node that implements Diameter services. Network node 400 contains processor(s) 402(1)-(n) and memory 404. While the memory is shown as one block, it can be distributed over multiple memories within server 400. Diameter protocol module 410 implements Diameter protocol services for network node 400, and comprises individual Diameter session instances 412(1) . . . 412(n) for each individual session. Each Diameter session instance 412 contains a session cache 414(1) . . . 414(n) that contains information pertaining to a Diameter session.

If a session is mirrored on a remote server, information about any mirrors of a session will be contained in the session cache 414. Each Diameter session instance 412 performs the necessary services for that Diameter session. If network node 400 is acting as a mirror for a Diameter session on a remote network node (not shown), no Diameter services will be provided by the corresponding Diameter session instance 412; instead, the Diameter session cache 414 will contain a complete record of all Diameter protocol communications forwarded to it from the master Diameter server (not shown) for that Diameter session, but no action will be taken by network node 400. When a Diameter session is started, or if Diameter mirroring is desired for a previously-started session, Diameter mirror selection module 416 is invoked to select a mirror. The list of mirrors may be selected from mirror list 418, which may be populated using DNS-SRV or DNS-NAPTR.

Diameter session instances 412(n) may communicate directly with a Diameter client, as shown by arrow 420. However, in the case of a session that is mirrored on a remote Diameter mirror server (not shown), all communication sent to the Diameter client is also sent to Diameter mirroring module 422, which forwards communication to the remote Diameter mirror server, as shown by arrow 424. When incoming Diameter messages for a Diameter session that is mirrored are received at arrow 420, the messages may be copied to Diameter mirroring module 422, as indicated by arrow 420a, which copies these incoming messages to the remote Diameter mirror server as well as is indicated by arrow 424. The data paths described by arrows 420, 420a, and 424, as well as the data path between the session instances and the Diameter mirror server, may be implemented as a standard bus or switching fabric in some embodiments.

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The offload gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 5:
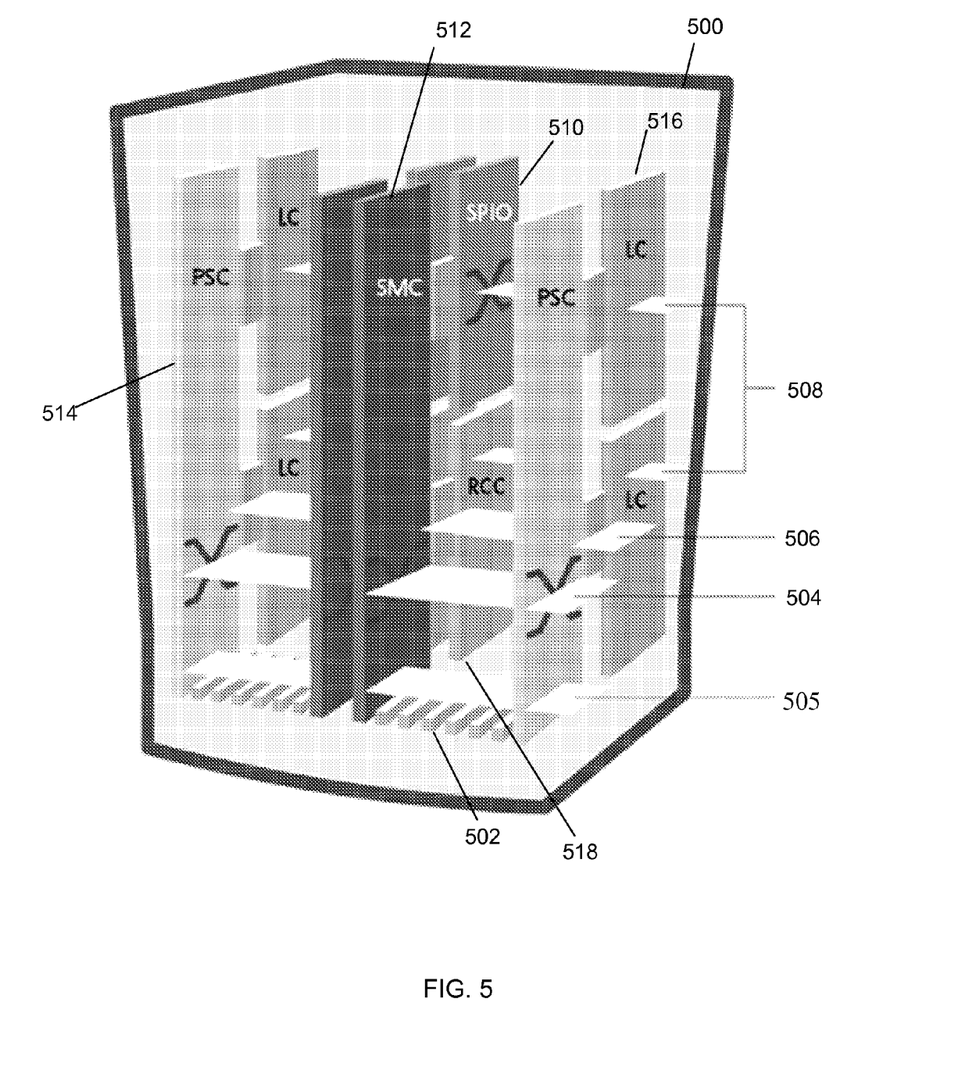
FIGS. 5-6 illustrate a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 5 illustrates the implementation of a network device in accordance with some embodiments. The network device 500 includes slots 502 for loading application cards and line cards. A midplane can be used in the network device to provide intra-network device communications, power connections, and transport paths between the various installed cards. The midplane can include buses such as a switch fabric 505, a control bus 506, a system management bus, a redundancy bus 508, and a time division multiplex (TDM) bus. The switch fabric 504 is an IP-based transport path for user data throughout the network device implemented by establishing inter-card communications between application cards and line cards. The control bus 506 interconnects the control and management processors within the network device. The network device management bus provides management of system functions such as supplying power, monitoring temperatures, board status, data path errors, card resets, and other failover features. The redundancy bus 508 provides transportation of user data and redundancy links in the event of hardware failures. The TDM bus provides support for voice services on the system.

The network device supports at least four types of application cards: a switch processor I/O card (SPIO) 510, a system management card (SMC) 512, a packet service card (PSC) 515, and a packet accelerator card (not shown). Other cards used in the network device include line cards 566 and redundant crossbar cards (RCC) 518. The line cards 516, when loaded in the network device, provide input/output connectivity to the network and other devices, as well as redundancy connections. The line cards 516 include interfaces to the network through Ethernet, Fiber Optic, and the other communication mediums. The redundant crossbar card (RCC) 518 includes a non-blocking crossbar and connections to each of the cards in the network device. This allows a redundant connection to be made through the redundant crossbar card 518 from any one card to any other card in the network device. The SPIO card 510 serves as a controller of the network device and is responsible for such things as initializing the network device and loading software configurations onto other cards in the network device.

The system management card (SMC) 512 and switch processor card (not shown) are system control and management cards for managing and controlling other cards in the network device. The packet accelerator card (PAC) and packet service card (PSC) 514 provide packet processing, context processing capabilities, and forwarding capabilities among other things. The PAC and PSC 514 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group, users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 6:
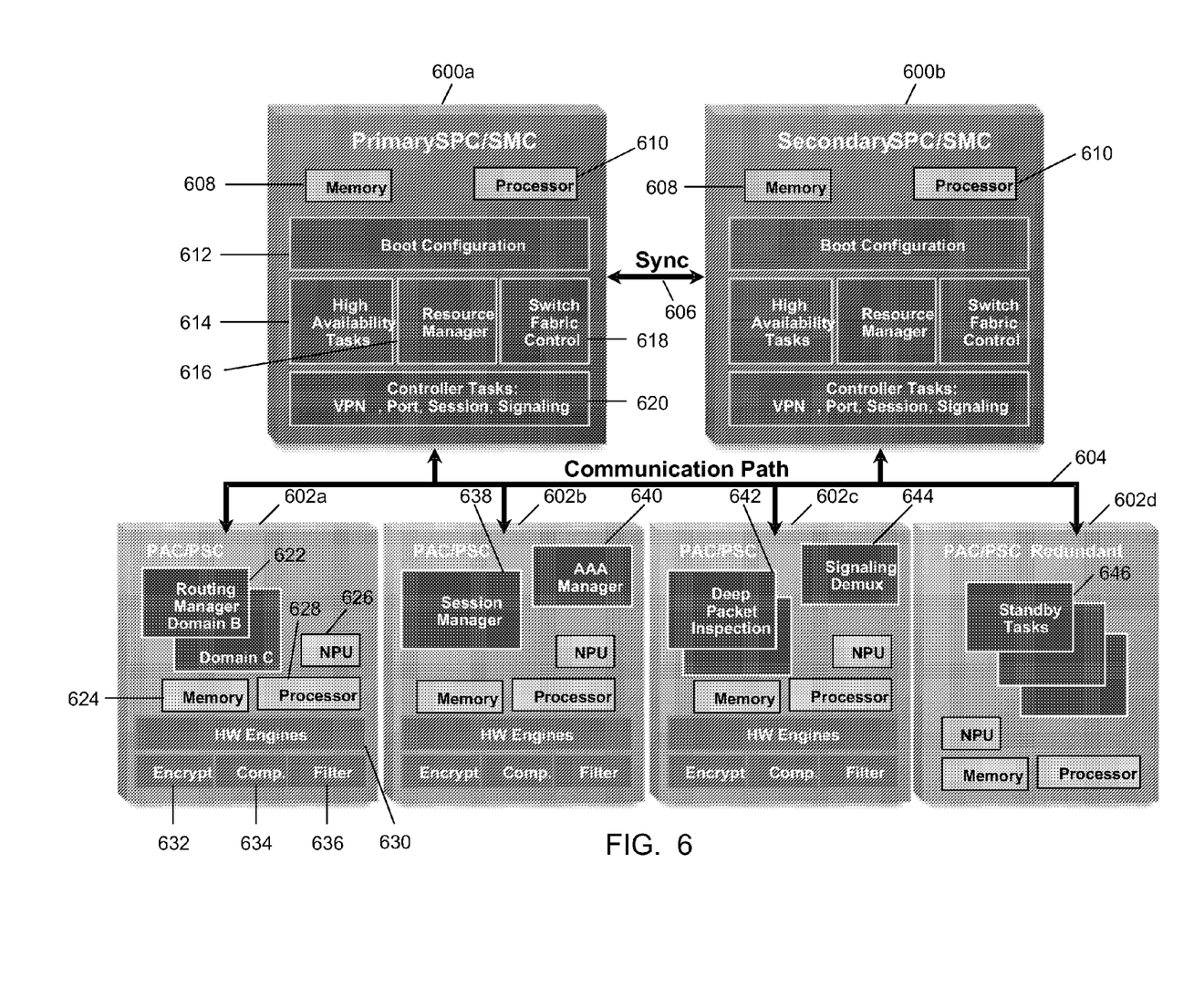

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 6 illustrates a logical view of the software architecture of a network device in accordance with certain embodiments. As shown, the software and hardware can be distributed within the network device and across different circuit boards, processors, and memory. FIG. 6 includes a primary switch processor card (SPC)/system management card (SMC) 600*a*, a secondary SPC/SMC 600*b*, PAC/PSC 602*a*-602*d*, a communication path 604, and a synchronization path 606. The SPC/SMC 600 include a memory 608, a processor 610, a boot configuration 612, high availability tasks 614, resource manager 616, switch fabric control 618, and controller tasks 620.

The SPC/SMC 600 manage and control the network device including the other cards in the network device. The SPC/SMC 600 can be configured in a primary and secondary arrangement that provides redundancy and failsafe protection. The modules or tasks running on the SPC/SMC 600 are related to network device wide control and management. The boot configuration task 612 includes information for starting up and testing the network device. The network device can also be configured to startup in different configurations and providing different implementations. These can include which functionalities and services are capable of running on the SPC/SMC 600. The high availability task 614 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 600 or a PAC/PSC 602, while some processor intensive tasks can also be performed across multiple PACs/PSCs to utilize multiple CPU resources. Distribution of these tasks is invisible to the user. The switch fabric control 618 controls the communication paths in the network device. The controller tasks module 620 can manage the tasks among the resources of the networks to provide, for example, VPN services, assign ports, and create, delete, and modify sessions for user equipment.

The PAC/PSC 602 are high-speed processing cards that are designed for packet processing and the tasks involved with providing various network functionalities on the network device. The PAC/PSC 602 include a memory 624, a network processing unit (NPU) 626, a processor 628, a hardware engine 630, an encryption component 632, a compression component 634, and a filter component 636. Hardware engines 630 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 602 is capable of supporting multiple contexts. The PAC/PSC 602 are also capable of running a variety of tasks or modules. PAC/PSC 602*a* provides routing managers 622 with each covering routing of a different domain. PAC/PSC 602*b* provides a session manager 638 and an AAA manager 640. The session manager 638 manages one or more sessions that correspond to one or more user equipment. A session allows a user equipment to communicate with the network for voice calls and data. The AAA manager 640 manages accounting, authentication, and authorization with an AAA server in the network. PAC/PSC 602 provides a deep packet inspection task 642 and a signaling demux 644. The deep packet inspection task 642 provides inspection of packet information beyond layer 4 for use and analysis by the network device. The signaling demux 644 can provide scalability of services in combination with other modules. PAC/PSC 602*d* provides redundancy through standby tasks 646. Standby tasks 646 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, Diameter mirror functionality can be combined or co-located with a PDSN or other IMS gateway.

We claim:

1. An authentication server comprising:
   a memory;
   a processor operable to execute instructions stored in the memory;
   a network interface in communication with an authentication client on a network using an authentication protocol;
   an authentication module for maintaining state for an individual authentication session with the authentication client; and
   a mirroring module in communication with the authentication module, the mirroring module configured to receive authentication messages from the authentication module and from the authentication client for the individual authentication session, the mirroring module configured to individually forward each of the received authentication messages to an authentication mirror via a service provider's network, and the mirroring module configured to select the authentication mirror from a pool of peer servers on the service provider's network,
   each incoming authentication message being forwarded upon arrival by the authentication server to provide synchronization with a mirror server, allowing the authentication mirror to be up-to-date,
   wherein the instructions are operable to send identifying information of the authentication mirror to the authentication client via authentication protocol messages while received authentication messages for the authentication session are being forwarded by the authentication module.

2. The authentication server of claim 1, wherein the authentication server is operable to mirror a plurality of client sessions to a plurality of authentication mirrors.

3. The authentication server of claim 1, wherein the authentication server is configured to be responsive to a request to serve as an authentication mirror for a mirrored session from a peer server, and to resume the mirrored session in place of the peer server in case of failure of the peer server.

4. The authentication server of claim 1, wherein the instructions are operable to select a peer server as a mirror at time of creation of a new authentication session between the authentication client and the authentication server.

5. The authentication server of claim 1, further comprising a module for functioning as a mirror of a peer server.

6. The authentication server of claim 1, wherein the authentication protocol is a Diameter-based protocol.

7. The authentication server of claim 1, wherein the authentication server is one of a Serving Gateway (SGW), a Policy Charging and Rules Function (PCRF), or a Call Session Control Function (CSCF).

8. A method comprising:
   receiving an authentication protocol message from an authentication client at a server initiating an authentication application session;
   receiving at a mirroring module authentication messages from authentication module and from authentication client for the authentication application session, the mirroring module individually forwarding the received authentication messages to a mirror server;
   establishing an authentication application session between the authentication client and the server;
   selecting at least the mirror server for the authentication application session from a pool of peer servers;
   configuring continuous and active forwarding of individual authentication protocol messages from the authentication client to the mirror server;
   sending identifying information about the mirror server to the authentication client in an authentication message while the authentication application session is being handled by the server; and
   allowing the mirror server to maintain up-to-date authentication state for the authentication application session.

9. The method of claim 8, further comprising receiving a request to serve as a mirror for an authentication session from the peer server and resuming the mirrored session in place of the peer server in case of failure of the peer server.

10. The method of claim 8, further comprising forwarding authentication protocol messages relating to a plurality of client sessions to a plurality of mirror servers.

11. The method of claim 8, further comprising maintaining a centralized list of mirror servers for each authentication session.

12. The method of claim 8, further comprising discovering and storing addresses of peer servers that may be selected as mirrors.

13. The method of claim 8, further comprising selecting a peer server as a mirror at time of creation of a new authentication session between the authentication client and the authentication server.

14. The method of claim 8, further comprising functioning as a mirror server of a peer authentication server.

15. The method of claim 8, wherein the authentication protocol is a Diameter-based protocol, the identifying information is an IP address, and the server is one of a Serving Gateway (SGW), a Policy Charging and Rules Function (PCRF), or a Call Session Control Function (CSCF).

16. Logic encoded in one or more non-transitory media that includes code for execution and when executed by a processor is operable to perform operations comprising:
   receiving an authentication protocol message from an authentication client at a server initiating an authentication application session;
   receiving at a mirroring module authentication messages from authentication module and from authentication client for the authentication application session, the mirroring module individually forwarding the received authentication messages to a mirror server;
   establishing an authentication application session between the authentication client and the server;
   selecting at least the mirror server for the authentication application session from a pool of peer servers;
   configuring continuous and active forwarding of individual authentication protocol messages from the authentication client to the mirror server;
   sending identifying information about the mirror server to the authentication client in an authentication message while the authentication application session is being handled by the server; and
   allowing the mirror server to maintain up-to-date authentication state for the authentication application session.

17. The logic of claim 16, the operations further comprising receiving a request to serve as a mirror for an authentication session from the peer server and resuming the mirrored session in place of the peer server in case of failure of the peer server.

18. The logic of claim 16, further comprising forwarding authentication protocol messages relating to a plurality of client sessions to a plurality of mirror servers.

19. The logic of claim 16, the operations further comprising discovering and storing addresses of peer servers that may be selected as mirrors.

20. The logic of claim 16, wherein the authentication protocol is a Diameter-based protocol, and the server is one of a Serving Gateway (SGW), a Policy Charging and Rules Function (PCRF), or a Call Session Control Function (CSCF).

* * * * *